(12) United States Patent
Jung

(10) Patent No.: US 12,710,623 B2
(45) Date of Patent: Aug. 18, 2026

(54) OPTICAL IMAGING SYSTEM

(71) Applicant: Samsung Electro-Mechanics Co., Ltd., Suwon-si (KR)

(72) Inventor: Jin Hwa Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 132 days.

(21) Appl. No.: 18/644,989

(22) Filed: Apr. 24, 2024

(65) Prior Publication Data

US 2024/0272403 A1 Aug. 15, 2024

Related U.S. Application Data

(60) Continuation of application No. 17/374,318, filed on Jul. 13, 2021, now Pat. No. 12,019,220, which is a continuation of application No. 16/737,189, filed on Jan. 8, 2020, now Pat. No. 11,092,786, which is a division of application No. 15/585,210, filed on May 3, 2017, now Pat. No. 10,571,656.

(30) Foreign Application Priority Data

Nov. 28, 2016 (KR) ........................ 10-2016-0159269

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 5,557,472 | A | 9/1996 | Ito et al. |
| 6,091,901 | A | 7/2000 | Ogawa |
| 10,571,656 | B2 | 2/2020 | Jung |
| 11,092,786 | B2 | 8/2021 | Jung |
| 2003/0112525 | A1 | 6/2003 | Reinecke et al. |

(Continued)

FOREIGN PATENT DOCUMENTS

| | | | |
|---|---|---|---|
| CN | 203606556 | U | 5/2014 |
| CN | 104834078 | A | 8/2015 |

(Continued)

OTHER PUBLICATIONS

Chinese Office Action issued on Nov. 7, 2019, in counterpart Chinese Patent Application No. 201710623962.6 (10 pages in English, 7 pages in Chinese).

Chinese Office Action issued on Oct. 11, 2021, in counterpart Chinese Patent Application No. 202010795607.9 (9 pages in English and 8 pages in Chinese).

(Continued)

*Primary Examiner* — Joseph P Martinez
(74) *Attorney, Agent, or Firm* — NSIP Law

(57) ABSTRACT

An optical imaging system includes a first lens having a convex image-side surface, a second lens having a convex object-side surface, a third lens having a concave image-side surface, a fourth lens having a concave object-side surface, a fifth lens having a concave image-side surface, a sixth lens having a concave object-side surface, and a seventh lens having refractive power. The first to seventh lenses are sequentially disposed to be spaced apart from each other by an interval in a direction from an object side toward an imaging plane.

15 Claims, 13 Drawing Sheets

(56) References Cited

U.S. PATENT DOCUMENTS

| | | | | |
|---|---|---|---|---|
| 2005/0117225 | A1* | 6/2005 | Ebbesmeier | G02B 13/02 359/649 |
| 2006/0285227 | A1 | 12/2006 | Kobayashi | |
| 2014/0139719 | A1 | 5/2014 | Fukaya | |
| 2014/0139722 | A1 | 5/2014 | Sugita | |
| 2015/0002946 | A1 | 1/2015 | Mori | |
| 2015/0198787 | A1 | 7/2015 | Kubota et al. | |
| 2015/0226941 | A1 | 8/2015 | Fukaya | |
| 2015/0226942 | A1 | 8/2015 | Suzuki | |
| 2016/0033742 | A1* | 2/2016 | Huang | G02B 13/0015 359/708 |
| 2016/0033743 | A1 | 2/2016 | Chen | |
| 2016/0124191 | A1 | 5/2016 | Hashimoto | |
| 2016/0170180 | A1 | 6/2016 | Son | |
| 2016/0187622 | A1 | 6/2016 | Huang | |
| 2017/0059826 | A1 | 3/2017 | Tang et al. | |
| 2017/0227734 | A1 | 8/2017 | Huang | |
| 2018/0149837 | A1 | 5/2018 | Jung | |

FOREIGN PATENT DOCUMENTS

| | | | |
|---|---|---|---|
| CN | 204832662 | U | 12/2015 |
| CN | 105319681 | A | 2/2016 |
| CN | 107037568 | A | 8/2017 |
| CN | 207164343 | U | 3/2018 |
| JP | H07-63988 | A | 3/1995 |
| JP | 3397446 | B2 | 4/2003 |
| JP | 2015-72404 | A | 4/2015 |
| KR | 10-2016-0070462 | A | 6/2016 |

OTHER PUBLICATIONS

Chinese Office Action issued on Mar. 12, 2024, in counterpart Chinese Patent Application No. 202210656896.3 (4 pages in English, 7 pages in Chinese).

U.S. Appl. No. 17/374,318, filed Jul. 13, 2021, Jin Hwa Jung, Samsung Electro-Mechanics Co., Ltd.

* cited by examiner

| | S1 | S2 | S3 | S4 | S5 | S6 | S8 | S9 | S10 | S11 | S12 | S13 | S14 | S15 |
|---|---|---|---|---|---|---|---|---|---|---|---|---|---|---|
| RADIUS OF CURVATURE | 1.3827407 | -20.9017249 | 5.6447197 | 2.3285119 | 2.9385992 | 1.9597643 | -8.0452440 | -10697.3390691 | -12.8861675 | -86.4388516 | -3.7004579 | 10.5281488 | 15.6685245 | -7.0780840 |
| K | -0.0440343 | 89.0000000 | 15.6681719 | 2.4011583 | 7.7116697 | -4.8948052 | 24.9089974 | 0.0000000 | 8.6193695 | 23.6533162 | 2.4525909 | 1.2543459 | 64.2969139 | 0.0001578 |
| A | -0.0017320 | -0.0957287 | -0.2573468 | -0.2448229 | 0.0837948 | 0.1054738 | -0.2688469 | -0.1471962 | -0.2189146 | -0.1934254 | 0.0976238 | 0.1023040 | -0.0718018 | -0.1190880 |
| B | -0.0331016 | 0.5550401 | 1.3703781 | 1.3191924 | -0.9238957 | -0.2970992 | -0.1296598 | 0.3268964 | 0.3492804 | 0.2750964 | -0.7355067 | -0.4779011 | 0.2398766 | 0.1160852 |
| C | 0.1230979 | -1.5708433 | -3.4398289 | -3.8524052 | 13.1061433 | 2.8134883 | 1.2335608 | 0.4226521 | 0.3463862 | -0.0052978 | 1.4906413 | 0.6583639 | -0.4942120 | -0.0657888 |
| D | -0.3135238 | 2.7924440 | 5.3279822 | 9.0225851 | -89.8378908 | -15.6509093 | -4.4086329 | -0.9059048 | -1.1177753 | -0.3524731 | -1.6917178 | -0.5824810 | 0.4936312 | -0.0109031 |
| E | 0.4826879 | -3.3190182 | -4.1860898 | -13.7020847 | 376.1360722 | 56.2554404 | 6.5520344 | -0.1507950 | 0.9719243 | 0.6362301 | 1.1869587 | 0.3644323 | -0.2837726 | 0.0331344 |
| F | -0.4764180 | 2.6025448 | -0.3353012 | 12.1512596 | -977.8065047 | -123.5511320 | -5.0532268 | 0.7566111 | -0.4372833 | -0.7019135 | -0.5194372 | -0.1621259 | 0.0981403 | -0.0179443 |
| G | 0.2904842 | -1.2952648 | 3.5443229 | -4.8259558 | 1549.0485901 | 165.4694529 | 0.0000000 | 0.0000000 | 0.1113682 | 0.4863432 | 0.1380903 | 0.0481640 | -0.0208036 | 0.0047477 |
| H | -0.1002795 | 0.3717619 | -2.6822450 | -0.9101592 | -1359.8164494 | -134.9376753 | 0.0000000 | 0.0000000 | -0.0129378 | -0.0922965 | -0.0204100 | -0.0084022 | 0.0024102 | -0.0008411 |
| J | 0.0148217 | -0.0469380 | 0.6808427 | 1.1549883 | 512.1045922 | 39.8649295 | 0.0000000 | 0.0000000 | 0.0000000 | 0.0000000 | 0.0012901 | 0.0006417 | -0.0001185 | 0.0000354 |

FIG. 3

| | S1 | S2 | S3 | S4 | S5 | S6 | S8 | S9 | S10 | S11 | S12 | S13 | S14 | S15 |
|---|---|---|---|---|---|---|---|---|---|---|---|---|---|---|
| RADIUS OF CURVATURE | 1.3977549 | -27.2260229 | 4.8843400 | 1.9684503 | 3.2043516 | 2.4163454 | -8.9160192 | -16.7645991 | 6.4814917 | 4.6169703 | -3.5005413 | 8.3498869 | 18.8572890 | -8.5393179 |
| K | -0.0645851 | 99.0000000 | 17.4801451 | 2.4452744 | 7.3560107 | -3.0281488 | 34.9089870 | 0.0000003 | 2.3823127 | 14.8577640 | 2.3957965 | 1.2543455 | 64.2969144 | 0.0001579 |
| A | -0.0008877 | -0.0219248 | -0.2195036 | -0.2941357 | 0.0477697 | 0.1049323 | -0.1578487 | -0.1313634 | -0.1590650 | -0.1051353 | 0.0949460 | 0.0204038 | -0.1596732 | -0.1841577 |
| B | -0.0317212 | 0.3923319 | 1.0065005 | 1.0884129 | -0.4013005 | -0.2088823 | -0.3086642 | -0.0312074 | 0.3288322 | 0.2570205 | -0.7863291 | -0.4134782 | 0.3678813 | 0.1937613 |
| C | 0.1135593 | -0.9825677 | -2.1092435 | -2.7855842 | 5.4199057 | 2.5651089 | 0.3051012 | -0.2875146 | -0.3000597 | -0.4170065 | 1.6272571 | 0.7432781 | -0.5836226 | -0.1518161 |
| D | -0.3000302 | 1.7802694 | 2.9066338 | 7.0451683 | -27.0146081 | -14.5228814 | -1.4717164 | 0.4665341 | 0.1155160 | 0.9386147 | -1.8878746 | -0.7680587 | 0.5453184 | 0.0743782 |
| E | 0.4731476 | -2.2160708 | -2.0585139 | -13.1559516 | 81.1186899 | 51.3108427 | 2.4930702 | -0.2059716 | 0.0555723 | -1.7083023 | 1.3635017 | 0.5070735 | -0.3433280 | -0.0217155 |
| F | -0.4725352 | 1.8287770 | -0.5258229 | 15.3416869 | -146.7527884 | -112.8759447 | -1.5233423 | 0.2179216 | -0.1160130 | 1.7920662 | -0.6172919 | -0.2243858 | 0.1368647 | 0.0026770 |
| G | 0.2889604 | -0.9598897 | 2.1824375 | -8.3999533 | 153.9311846 | 151.4093130 | 0.0000000 | 0.0000000 | 0.0609825 | -0.9489529 | 0.1701007 | 0.0658048 | -0.0379588 | 0.0002736 |
| H | -0.0998839 | 0.2869000 | -1.5284149 | 1.4059723 | -83.1241242 | -113.5562595 | 0.0000000 | 0.0000000 | -0.0103873 | 0.2293201 | -0.0260815 | -0.0115744 | 0.0043632 | -0.0001137 |
| J | 0.0145259 | -0.0377218 | 0.3871345 | 0.7962379 | 16.5605049 | 35.8755027 | 0.0000000 | 0.0000000 | 0.0000000 | 0.0000000 | 0.0017074 | 0.0009134 | -0.0002459 | 0.0000089 |

FIG. 6

| | S1 | S2 | S3 | S4 | S5 | S6 | S8 | S9 | S10 | S11 | S12 | S13 | S14 | S15 |
|---|---|---|---|---|---|---|---|---|---|---|---|---|---|---|
| RADIUS OF CURVATURE | 1.4002946 | -28.1907234 | 4.8529049 | 1.9890048 | 3.1396227 | 2.2577309 | -10.3729538 | -26.9838804 | 5.3794233 | 4.5765978 | -3.4616305 | 9.8957371 | 15.9313095 | -12.6672400 |
| K | -0.0807128 | 99.0000000 | 17.5671536 | 2.3932691 | 8.1331636 | -2.9434930 | 24.9059972 | 0.0000003 | 2.3823125 | 18.9229484 | 2.4284959 | 1.2543495 | 84.2969144 | 0.0001579 |
| A | 0.0006991 | -0.0217376 | -0.2327978 | -0.2712294 | 0.0304346 | 0.0732335 | -0.2013845 | -0.3028261 | -0.3631418 | -0.1748183 | 0.0918345 | 0.0470296 | -0.1514939 | -0.1761349 |
| B | -0.0280225 | 0.3584210 | 1.0683290 | 1.2102921 | -0.5115499 | -0.0435733 | 0.0972707 | 0.7628770 | 1.0710349 | 0.5217176 | -0.8106186 | -0.4911157 | 0.3774931 | 0.2320799 |
| C | 0.1057831 | -1.0185085 | -2.1288397 | -2.8709020 | 8.2224137 | 2.3041471 | -0.6041071 | -1.7599342 | -1.2490215 | -0.7286342 | 1.7016325 | 0.8843887 | -0.6236490 | -0.2090871 |
| D | -0.2933593 | 1.9284063 | 2.8171013 | 7.1176394 | -58.5815070 | -14.1114038 | -0.4448539 | 1.6135025 | 0.3473449 | 1.4483500 | -1.9952771 | -0.9543873 | 0.6229278 | 0.1158063 |
| E | 0.4718076 | -2.5326699 | -1.9436821 | -13.5466033 | 226.4891791 | 49.7822312 | 1.2493892 | -0.4834109 | 0.7166099 | -2.9871138 | 1.4562090 | 0.6663928 | -0.4011538 | -0.0389072 |
| F | -0.4758760 | 2.1984221 | -0.6825874 | 15.9800213 | -548.0889927 | -108.7806928 | -0.6489726 | 0.2852920 | -1.0637765 | 3.8062616 | -0.6666782 | -0.3086325 | 0.1642840 | 0.0067218 |
| G | 0.2917101 | -1.1949938 | 2.4594633 | -9.8491383 | 810.2623979 | 145.4272858 | 0.0000000 | 0.0000000 | 0.6048988 | -2.3011091 | 0.1859691 | 0.0927586 | -0.0408745 | -0.0001695 |
| H | -0.1007517 | 0.3867034 | -1.7689861 | 1.0572153 | -669.2570412 | -108.9469346 | 0.0000000 | 0.0000000 | -0.1230439 | 0.6128241 | -0.0288820 | -0.0184137 | 0.0056150 | -0.0001118 |
| J | 0.0146989 | -0.0485359 | 0.4396339 | 1.2807561 | 237.0776276 | 33.9235366 | 0.0000000 | 0.0000000 | 0.0000000 | 0.0000000 | 0.0019150 | 0.0012898 | -0.0003269 | 0.0000114 |

FIG. 9

| | S1 | S2 | S3 | S4 | S5 | S6 | S8 | S9 | S10 | S11 | S12 | S13 | S14 | S15 |
|---|---|---|---|---|---|---|---|---|---|---|---|---|---|---|
| RADIUS OF CURVATURE | 1.4062344 | -31.6890693 | 4.8719942 | 1.9609889 | 3.2882807 | 3.2882807 | -8.4278681 | -27.7002309 | 5.0542728 | 5.1065647 | -3.4556320 | 12.7302614 | 733.4587262 | -7.2698634 |
| K | -0.0590400 | 99.0000000 | 17.3445777 | 2.4098887 | 9.3304770 | 9.3304770 | 24.9089971 | 0.0000002 | 2.3823125 | 20.0274803 | 2.3673381 | 1.2543452 | 64.2989145 | 0.0001579 |
| A | 0.0015363 | 0.0032680 | -0.1464406 | -0.2155965 | 0.0360027 | 0.0360027 | -0.2026931 | -0.2874614 | -0.3058644 | -0.1457197 | 0.0746257 | 0.0581335 | -0.1134712 | -0.1510941 |
| B | -0.0303197 | 0.1470111 | 0.4954373 | 0.8580508 | -0.8080180 | -0.8080180 | -0.0472765 | 0.6832064 | 1.0213130 | 0.5048922 | -0.7060730 | -0.3709863 | 0.3911721 | 0.2208978 |
| C | 0.1011427 | -0.3650494 | -0.1372809 | -1.5725046 | 13.9080992 | 13.9080992 | -0.0063346 | -1.8068102 | -1.6684911 | -0.9293210 | 1.4886030 | 0.4373494 | -0.8427258 | -0.2301674 |
| D | -0.2690129 | 0.3951979 | -1.4248975 | 4.5851267 | -89.7558859 | -89.7558859 | -2.1951916 | 1.9983261 | 1.4870271 | 1.8096324 | -1.7332721 | -0.2645184 | 0.9748167 | 0.1393319 |
| E | 0.4332531 | -0.6266837 | 3.5703442 | -11.3395407 | 350.1508524 | 350.1508524 | 3.8721988 | -0.8030278 | -0.4582858 | -2.9708896 | 1.2456753 | 0.0919382 | -0.6655990 | -0.0470412 |
| F | -0.4390041 | 0.7121428 | -4.8940174 | 15.7963399 | -855.3544689 | -855.3544689 | -2.4877832 | 0.2973538 | -0.4414671 | 3.0102300 | -0.5587413 | -0.0367807 | 0.2761002 | 0.0073272 |
| G | 0.2685703 | -0.4820664 | 4.1256363 | -10.7271380 | 1277.3273229 | 1277.3273229 | 0.0000000 | 0.0000000 | 0.4183449 | -1.6666033 | 0.1524044 | 0.0101837 | -0.0683539 | 0.0000947 |
| H | -0.0918063 | 0.1750661 | -1.9526497 | 1.2892488 | -1066.5181242 | -1066.5181242 | 0.0000000 | 0.0000000 | -0.0957910 | 0.3876172 | -0.0231369 | -0.0028875 | 0.0082972 | -0.0001748 |
| J | 0.0132962 | -0.0284130 | 0.3911353 | 1.3711372 | 382.2520441 | 382.2520441 | 0.0000000 | 0.0000000 | 0.0000000 | 0.0000000 | 0.0014999 | 0.0003274 | -0.0005358 | 0.0000153 |

FIG. 12

OPTICAL IMAGING SYSTEM

CROSS-REFERENCE TO RELATED APPLICATIONS

This application is a continuation of application Ser. No. 17/374,318 filed on Jul. 13, 2021, now U.S. Pat. No. 12,019,220 issued on Jun. 25, 2024, which is a continuation of application Ser. No. 16/737,189 filed on Jan. 8, 2020, now U.S. Pat. No. 11,092,786 issued on Aug. 17, 2021, which is a division of application Ser. No. 15/585,210 filed on May 3, 2017, now U.S. Pat. No. 10,571,656 issued on Feb. 25, 2020, and claims the benefit under 35 USC 119 (a) of Korean Patent Application No. 10-2016-0159269 filed on Nov. 28, 2016, in the Korean Intellectual Property Office, the entire disclosures of which are incorporated herein by reference for all purposes.

BACKGROUND

1. Field

The following description relates to a telescopic optical imaging system including seven lenses.

2. Description of Related Art

Telescopic optical imaging systems capable of capturing images of distant objects may be significantly large. In detail, in terms of telescopic optical imaging systems, the ratio (TL/f) of the overall length TL of a telescopic optical imaging system to the overall focal length f may be higher than or equal to 1. Thus, it may be difficult to mount telescopic optical imaging systems in small electronic devices, such as portable terminals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a convex image-side surface, a second lens having a convex object-side surface, a third lens having a concave image-side surface, a fourth lens having a concave object-side surface, a fifth lens having a concave image-side surface, a sixth lens having a concave object-side surface, and a seventh lens.

The first lens of the optical imaging system may have a convex object-side surface along the optical axis. The second lens of the optical imaging system can have a concave image-side surface along the optical axis. The third lens of the optical imaging may have a convex object-side surface along the optical axis. The fourth lens of the optical imaging system can have a convex image-side surface along the optical axis.

The fifth lens of the optical imaging system may have a convex object-side surface along the optical axis. The sixth lens of the optical imaging system can have a concave image-side surface along the optical axis. The seventh lens of the optical imaging system may have opposing convex surfaces along the optical axis. The one or both lenses between the sixth lens and the seventh lens of the optical imaging system can have an inflection point.

In another general aspect, an optical imaging system includes a first lens having a positive refractive power; a second lens having a negative refractive power; a third lens having a negative refractive power; a fourth lens having a negative refractive power; a fifth lens; a sixth lens; and a seventh lens, sequentially disposed from an object side to an imaging plane. The optical imaging system satisfies the expression $Nd2<1.67$, where Nd2 represents a refractive index of the second lens.

The optical imaging system may satisfy the expression $0.7<TL/f<1.0$, where TL represents a distance from an object-side surface of the first lens to an imaging plane, and f represents an overall focal length of the optical imaging system. The optical imaging system can satisfy the expression $0.1<f/(IMG\ HT)<2.5$, where f represents the overall focal length of the optical imaging system, and IMG HT represents one half of a diagonal length of the imaging plane. The optical imaging system may satisfy the expression $1.5<Nd5<1.7$, where Nd5 represents a refractive index of the fifth lens.

The optical imaging system may also satisfy the expression $1.6<Nd7$, where Nd7 represents a refractive index of the seventh lens. The optical imaging system can further satisfy the expression $-70<f5/f<70$, where f represents the overall focal length of the optical imaging system, and f5 represents a focal length of the fifth lens. The optical imaging system may satisfy the expression $2.4<f/EPD<2.8$, where f represents the overall focal length of the optical imaging system, and EPD represents a diameter of an entrance pupil.

In another general aspect, an optical imaging system includes a first lens, a second lens, a third lens, a fourth lens, a fifth lens, a sixth lens, and a seventh lens, sequentially disposed from an object side to an imaging plane. The first lens has a positive refractive power. The seventh lens has a convex object-side surface along an optical axis and a convex image-side surface along the optical axis.

The each of the first to seventh lenses of the optical imaging system may have an aspheric surface. The first lens of the optical imaging system may have a convex object-side surface having a most convex point of the optical imaging system. The second lens of the optical imaging system may have a concave image-side surface having a most concave point of the optical imaging system. The second lens, the third lens, the fourth and the sixth lens of the optical imaging system each may have a negative refractive power.

Other features and aspects will be apparent from the following detailed description, the drawings, and the claims.

BRIEF DESCRIPTION OF DRAWINGS

FIG. 3 is a table listing aspherical characteristics of the optical imaging system illustrated in FIG. 1.

FIG. 6 is a table listing aspherical characteristics of the optical imaging system illustrated in FIG. 4.

FIG. 9 is a table listing aspherical characteristics of the optical imaging system illustrated in FIG. 7.

FIG. 12 is a table listing aspherical characteristics of the optical imaging system illustrated in FIG. 10.

Throughout the drawings and the detailed description, the same reference numerals refer to the same elements where applicable. The drawings may not be to scale, and the relative size, proportions, and depiction of elements in the drawings may be exaggerated for clarity, illustration, or convenience.

DETAILED DESCRIPTION

Figure 1:
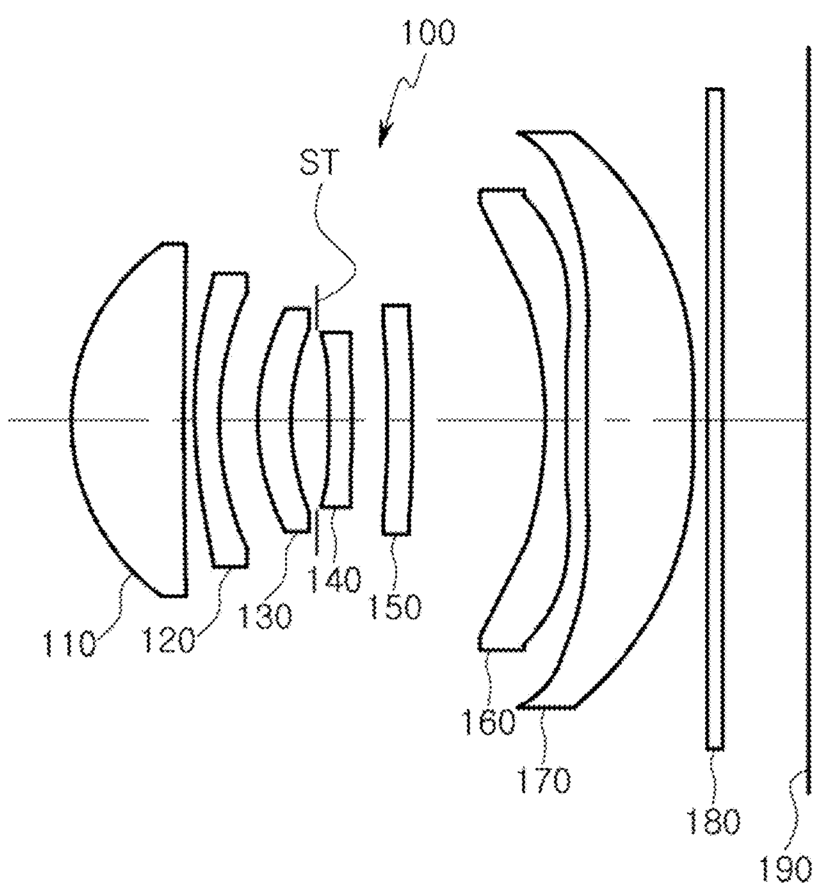
FIG. 1 is a diagram of an optical imaging system according to a first example.

Hereinafter, examples will be described as follows with reference to the attached drawings. Examples provide an optical imaging system capable of capturing images of distant objects while being mounted in a small terminal. The disclosure may, however, be exemplified in many different forms and should not be construed as being limited to the specific embodiments set forth herein. Rather, these embodiments are provided so that this disclosure will be thorough and complete, and will fully convey the scope of the disclosure after an understanding of this application.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

According to an example, a first lens refers to a lens closest to an object or a subject of which an image is captured. A seventh lens refers to a lens closest to an imaging plane or an image sensor. In the present specification, an entirety of a radius of curvature, a thickness, a distance from an object-side surface of a first lens to an imaging plane (TL), one half of a diagonal length of the imaging plane (IMG HT), and a focal length of a lens are indicated in millimeters (mm). A person skilled in the relevant art will appreciate that other units of measurement may be used. Further, in embodiments, all radii of curvature, thicknesses, OALs (optical axis distances from the first surface of the first lens to the image sensor), distances on the optical axis between the stop and the image sensor (SLs), image heights (IMG HTs), back focus lengths (BFLs), overall focal lengths of an optical system, and a focal length of each lens are indicated in millimeters (mm). Further, thicknesses of lenses, gaps between the lenses, OALs, TLs, SLs are distances measured based on an optical axis of the lenses.

In a description of a form of a lens, a surface of a lens being convex means that an optical axis portion of a corresponding surface is convex, while a surface of a lens being concave means that an optical axis portion of a corresponding surface is concave. Therefore, in a configuration in which a surface of a lens is described as being convex, an edge portion of the lens may be concave. In a manner the same as the case described above, even in a configuration in which a surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include seven lenses with a refractive power. However, the number of lenses in the optical system may vary, for example, between two to seven lenses, while achieving the various results and benefits described below. Also, although each lens is described with a particular refractive power, a different refractive power for at least one of the lenses may be used to achieve the intended result.

An optical imaging system includes seven lenses. For example, the optical imaging system may include the first lens, a second lens, a third lens, a fourth lens, a fifth lens, a sixth lens, and the seventh lens, sequentially disposed from an object side to an imaging plane.

The first lens has a refractive power. For example, the first lens has a positive refractive power. The first lens has a convex surface. In an embodiment, the first lens has a convex image-side surface.

The first lens has an aspherical surface. For example, both surfaces of the first lens are aspherical. The first lens is formed using a material having a relatively high degree of light transmittance and excellent workability. In an example, the first lens is formed using a plastic material. However, a material of the first lens is not limited to being a plastic material. In another example, the first lens may be formed using a glass material. The first lens has a relatively low refractive index. In an embodiment, a refractive index of the first lens is lower than 1.6.

The second lens has a refractive power. For example, the second lens has a negative refractive power. The second lens has a convex surface. In an embodiment, the second lens has a convex object-side surface.

The second lens has an aspherical surface. For example, the second lens has an aspherical object-side surface. The second lens is formed using a material having a relatively high degree of light transmittance and excellent workability. In an example, the second lens is formed using a plastic material. However, a material of the second lens is not limited to being plastic. In another example, the second lens may be formed using a glass material. The second lens has a refractive index. In an embodiment, a refractive index of the second lens is lower than 1.67.

The third lens has a refractive power. For example, the third lens has a negative refractive power. The third lens has a concave surface. In an embodiment, the third lens has a concave image-side surface.

The third lens has an aspherical surface. For example, the third lens has an aspherical image-side surface. The third lens is formed using a material having a relatively high degree of light transmittance and excellent workability. In an example, the third lens is formed using a plastic material. However, a material of the third lens is not limited to being plastic. In another example, the third lens may be formed using a glass material. The third lens has a refractive index substantially similar to that of the first lens. In more detail for an embodiment, the refractive index of the third lens is lower than 1.6.

The fourth lens has a refractive power. For example, the fourth lens has a negative refractive power. The fourth lens has a concave surface. In an embodiment, the fourth lens has a concave object-side surface.

The fourth lens has an aspherical surface. For example, both surfaces of the fourth lens are aspherical. The fourth lens is formed using a material having a relatively high degree of light transmittance and excellent workability. In an example, the fourth lens is formed using a plastic material. However, a material of the fourth lens is not limited to being plastic. In another example, the fourth lens may be formed using a glass material. The fourth lens has a refractive index higher than that of the first lens. In an embodiment, the refractive index of the fourth lens is higher than or equal to 1.6.

The fifth lens has a refractive power. For example, the fifth lens has a positive or a negative refractive power. The fifth lens has a meniscus form. In embodiments, the fifth lens may have a meniscus form in which an object-side surface or an image-side surface is concave.

The fifth lens has an aspherical surface. For example, both surfaces of the fifth lens are aspherical. The fifth lens is formed using a material having a relatively high degree of light transmittance and excellent workability. In an example, the fifth lens is formed using a plastic material. However, a material of the fifth lens is not limited to being plastic. In another example, the fifth lens may be formed using a glass material. The fifth lens has a refractive index. In an embodiment, a refractive index of the fifth lens is above 1.5 and below 1.7.

The sixth lens has a refractive power. For example, the sixth lens has a negative refractive power. The sixth lens may have a concave surface. In one example, the sixth lens has a concave object-side surface. The sixth lens may have an inflection point. In embodiments, the sixth lens may include one or more inflection points formed on opposing surfaces.

The sixth lens has an aspherical surface. For example, both surfaces of the sixth lens are aspherical. The sixth lens is formed using a material having a relatively high degree of light transmittance and excellent workability. In an example, the sixth lens is formed using a plastic material. However, a material of the sixth lens is not limited to being plastic. In another example, the sixth lens may be formed using a glass material. The sixth lens has a refractive index substantially similar to that of the first lens. In an embodiment, the refractive index of the sixth lens is lower than 1.6.

The seventh lens has a refractive power. For example, the seventh lens has a positive or a negative refractive power. The seventh lens may have at least one convex surface. For example, the seventh lens has opposing convex surfaces. The seventh lens may have an inflection point. In embodiments, the seventh lens includes one or more inflection points formed on opposing surfaces.

The seventh lens may have an aspherical surface. For example, both surfaces of the seventh lens are aspherical. The seventh lens is formed using a material having a relatively high degree of light transmittance and excellent workability. In an example, the seventh lens is formed using a plastic material. However, a material of the seventh lens is not limited to being plastic. In another example, the seventh lens may be formed using a glass material. The seventh lens has a refractive index lower than that of the first lens. In an embodiment, the refractive index of the seventh lens may be lower than 1.53.

Aspherical surfaces of the first to seventh lenses may be expressed using Equation 1 below.

$$Z = \frac{cr^2}{1 + \sqrt{1 - (1 - k)c^2r^2}} + Ar^4 + Br^6 + Cr^8 + Dr^{10} + Er^{12} + Fr^{14} + Gr^{16} + Hr^{18} + Jr^{20} \quad (1)$$

In Formula 1, c represents an inverse of a radius of curvature of a lens, k represents a conic constant, r represents a distance from a certain point on an aspherical surface of the lens to an optical axis, A to H and J represent aspherical constants, and Z (or SAG) represents a distance between the certain point on the aspherical surface of the lens at the distance r and a tangential plane meeting the apex of the aspherical surface of the lens.

The optical imaging system further includes a filter, an image sensor, and a stop. The filter is disposed between the seventh lens and the image sensor. The filter blocks a portion of wavelengths of light, in order to generate a clear image. For example, the filter blocks light of an infrared wavelength.

The image sensor forms an imaging plane. For example, a surface of the image sensor forms the imaging plane. The stop is disposed to adjust an amount of light incident on a lens. In an embodiment, the stop is interposed between the third lens and the fourth lens.

The optical imaging system satisfies the following Conditional Expressions:

$$0.7 < TL/f < 1.0 \quad \text{(Conditional Expression 1)}$$

$$0.1 < f/(IMG\ HT) < 2.5 \quad \text{(Conditional Expression 2)}$$

-continued $$Nd2 < 1.67 \quad \text{(Conditional Expression 3)}$$

$$1.5 < Nd5 < 1.7 \quad \text{(Conditional Expression 4)}$$

$$1.6 < Nd7 \quad \text{(Conditional Expression 5)}$$

$$-70 < f5/f < 70 \quad \text{(Conditional Expression 6)}$$

$$2.4 < f/EPD < 2.8 \quad \text{(Conditional Expression 7)}$$

In the Conditional Equations, TL represents a distance from the object-side surface of the first lens to an imaging plane, f represents an overall focal length of the optical imaging system, and IMG HT represents one half of a diagonal length of the imaging plane. Nd2 represents a refractive index of the second lens, Nd5 represents a refractive index of the fifth lens, Nd7 represents a refractive index of the seventh lens, f5 represents a focal length of the fifth lens, and EPD represents a diameter of an entrance pupil.

Conditional Expression 1 is provided for the miniaturization of the optical imaging system. In further detail, in cases in which the optical imaging system is beyond an upper limit value of Conditional Expression 1, it may be difficult to miniaturize the optical imaging system, so that it likewise may be difficult to mount the optical imaging system in a portable terminal. In cases in which the optical imaging system is below a lower limit value of Conditional Expression 1, it may be difficult to manufacture the optical imaging system.

Conditional Expression 2 is provided for mounting the optical imaging system in a portable terminal. In further detail, in cases in which the optical imaging system is beyond an upper limit value of Conditional Expression 2, it may be difficult to maintain resolution and telescopic characteristics, as well as a relatively wide angle of view. Conditional Expression 3 is provided for selection of a material of the second lens.

Conditional Expression 4 is provided for selection of a material of the fifth lens. In detail, in cases in which the fifth lens is below a lower limit value of Conditional Expression 4, it may be difficult to correct chromatic aberrations. In cases in which the fifth lens is beyond an upper limit value of Conditional Expression 4, it may be difficult to correct aberrations by adjusting a distance between the fifth lens and the sixth lens.

Conditional Expression 5 is provided for selection of a material of the seventh lens. In detail, since the seventh lens satisfying a numerical range of Conditional Expression 5 has a relatively low Abbe number less than or equal to 26, ease of correction of astigmatism, longitudinal chromatic aberrations, and chromatic aberrations of magnification is facilitated.

Conditional Expression 6 is provided as a design parameter of the fifth lens for a high-resolution optical imaging system. In detail, in cases in which the fifth lens is outside of a numerical range of Conditional Expression 6, the fifth lens may increase aberrations, so that it may be difficult to provide a high-resolution optical system. Conditional Expression 7 is provided as a numerical range of an F number for a high-resolution telescopic optical imaging system.

In the optical imaging system, a lens having a relatively high degree of positive refractive power may be disposed to be adjacent to an object. In detail, the first lens in the optical imaging system may have the highest degree of positive refractive power. In the optical imaging system, a lens having a relatively high degree of negative refractive power may be disposed to be substantially adjacent to the imaging plane. In detail, the sixth lens may have the highest degree of negative refractive power.

The first lens in the optical imaging system may have a surface including the most convex point. In detail, the object-side surface of the first lens may include the most convex point. The second lens in the optical imaging system may have substantially a surface including the most concave point. In detail, an image-side surface of the second lens may include the most concave point.

A focal length of lenses forming the optical imaging system may be selected from within a predetermined range. For example, a focal length of the first lens is selected from within a range of 2.2 mm to 2.8 mm, a focal length of the second lens is selected from within a range of −7.0 mm to −4.0 mm, a focal length of the third lens is selected from within a range of −21 mm to −10 mm, a focal length of the fourth lens is selected from within a range of −31 mm to −10 mm, and a focal length of the sixth lens is selected from within a range of −6.0 mm to −3.0 mm. The ranges are examples, and thus other ranges and combinations of ranges may be apparent after an understanding of the disclosure of this application.

In the optical imaging system, thicknesses of lenses may be different. In detail, among the first to seventh lenses, the first lens may be the thickest, while the second lens or the sixth lens may be the thinnest. Odd-numbered lenses may be substantially thicker than even-numbered lenses disposed adjacently thereto. In an example, the first lens is thicker than the second lens, while the third lens is thicker than the second lens and the fourth lens.

Distances between lenses in the optical imaging system may be different. As an example, a distance between the fifth lens and the sixth lens is the longest, while a distance between the first lens and the second lens is the shortest.

Subsequently, an optical imaging system according to various examples will be described. First of all, the optical imaging system according to a first example will be described with reference to FIG. 1. An optical imaging system 100 includes a first lens 110, a second lens 120, a third lens 130, a fourth lens 140, a fifth lens 150, a sixth lens 160, and a seventh lens 170.

The first lens 110 has a positive refractive power and opposing convex surfaces. The second lens 120 has a negative refractive power, a convex object-side surface, and a concave image-side surface. The third lens 130 has a negative refractive power, a convex object-side surface, and a concave image-side surface. The fourth lens 140 has a negative refractive power, a concave object-side surface, and a convex image-side surface.

The fifth lens 150 has a negative refractive power, a concave object-side surface, and a convex image-side surface. The sixth lens 160 has a negative refractive power and opposing concave surfaces. In addition, the sixth lens 160 includes inflection points formed on opposing surfaces. The seventh lens 170 has a positive refractive power and opposing convex surfaces. In addition, the seventh lens 170 includes inflection points formed on opposing surfaces.

In the configuration described above, first lens 110 has the highest degree of positive refractive power, while sixth lens 160 has the highest degree of negative refractive power. In the example described above, an object-side surface of first lens 110 is more convex than surfaces of other lenses, while the image-side surface of third lens 130 is more concave than surfaces of other lenses. In the configuration described above, a paraxial region of first lens 110 is formed to be thicker than paraxial regions of other lenses. Paraxial regions of even-numbered lenses 120, 140, and 160 are formed to be thinner than paraxial regions of odd-numbered lenses 110, 130, 150, and 170. In the example described above, a distance between fifth lens 150 and sixth lens 160 is longer than that between other lenses. A distance between first lens 110 and second lens 120 is shorter than that between other lenses.

Optical imaging system 100 further includes a filter 180, an image sensor 190, and a stop ST. Filter 180 is interposed between seventh lens 170 and image sensor 190, while stop ST is interposed between third lens 130 and fourth lens 140.

A refractive index of first lens 110, a refractive index of third lens 130, and a refractive index of sixth lens 160 in the optical imaging system 100, are lower than or equal to 1.55. In this case, the refractive index of the first lens 110 is substantially the same as that of the third lens 130. The refractive index of second lens 120 and the refractive index of seventh lens 170, in the optical imaging system 100, are higher than or equal to 1.64.

An effective diameter of a lens in the optical imaging system 100 may be gradually reduced in a direction toward the stop ST. For example, an effective diameter of third lens 130 disposed adjacently to stop ST or an effective diameter of fourth lens 140 are smaller than effective diameters of lenses adjacent thereto. In a manner different from the case described above, a lens disposed distantly from stop ST may have a relatively large effective diameter. As an example, the seventh lens 170 disposed farthest from stop ST has the largest effective diameter.

Figure 2:
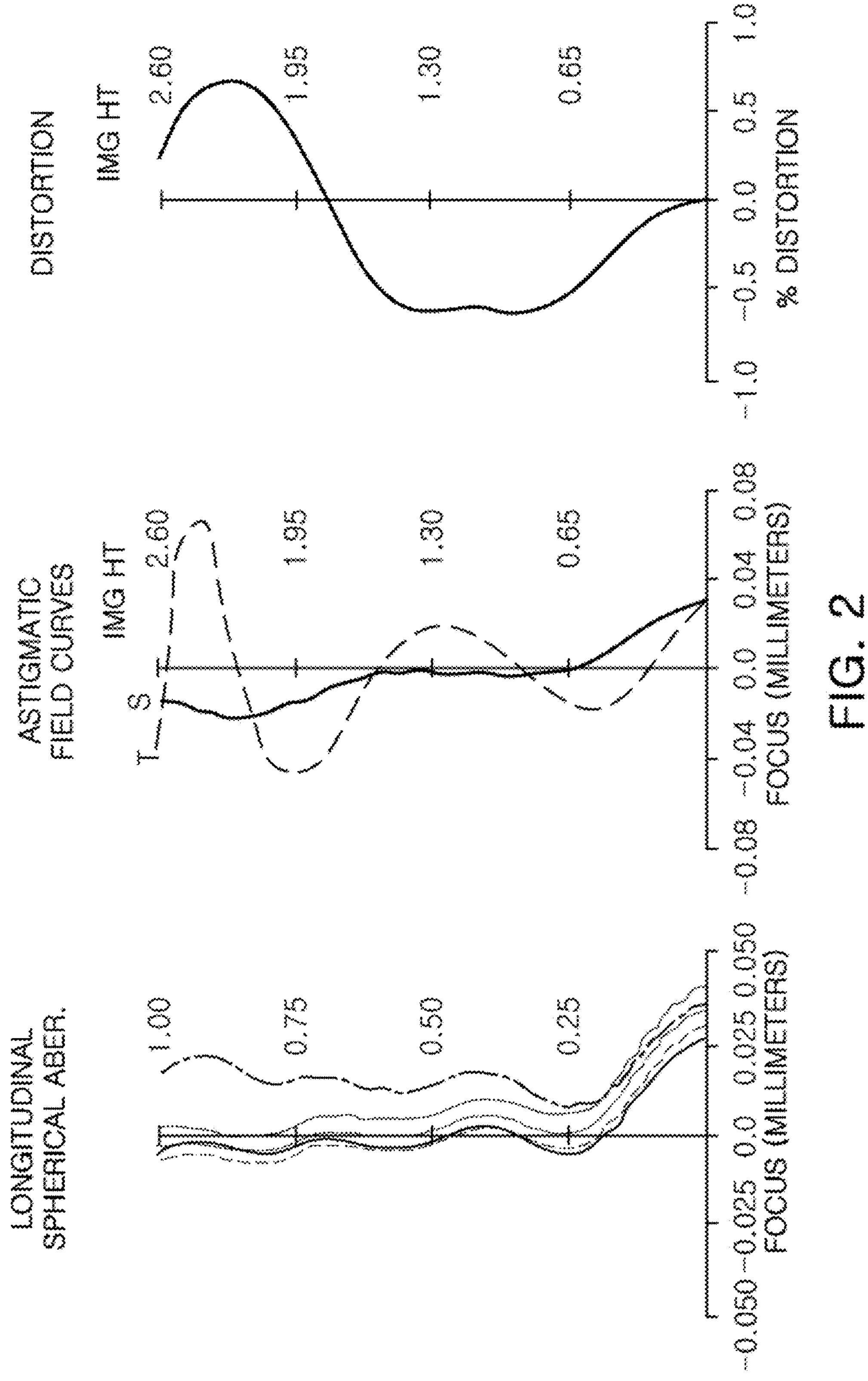
FIG. 2 is a set of graphs illustrating aberration curves of the optical imaging system illustrated in FIG. 1.

An optical imaging system having the configuration described above has aberration characteristics as illustrated by the graphs in FIG. 2. FIG. 3 lists aspherical characteristics of the optical imaging system according to the example. Table 1 lists lens characteristics of the optical imaging system according to the example.

negative refractive power, a convex object-side surface, and a concave image-side surface. The third lens 230 has a negative refractive power, a convex object-side surface, and a concave image-side surface. The fourth lens 240 has a negative refractive power, a concave object-side surface, and a convex image-side surface.

The fifth lens 250 has a negative refractive power, a convex object-side surface, and a concave image-side surface. The sixth lens 260 has a negative refractive power and opposing concave surfaces. In addition, the sixth lens 260 includes inflection points formed on opposing surfaces. The seventh lens 270 has a positive refractive power and opposing convex surfaces. In addition, the seventh lens 270 includes inflection points formed on opposing surfaces.

In the configuration described above, first lens 210 has the highest degree of positive refractive power, while sixth lens 260 has the highest degree of negative refractive power. In the example described above, an object-side surface of first lens 210 is more convex than surfaces of other lenses, while the image-side surface of second lens 220 is more concave than surfaces of other lenses. In the configuration described above, a paraxial region of the first lens 210 is formed to be thicker than paraxial regions of other lenses. Thicknesses of paraxial regions of fourth lens 240 to sixth lens 260 are formed to be substantially the same. In the example described above, a distance between the fifth lens 250 and the sixth lens 260 is longer than that between other lenses. A distance between first lens 210 and second lens 220 is shorter than that between other lenses.

The optical imaging system 200 further includes a filter 280, an image sensor 290, and a stop ST. Filter 280 is interposed between seventh lens 270 and image sensor 290, while stop ST is interposed between third lens 230 and fourth lens 240.

A refractive index of first lens 210, a refractive index of third lens 230, a refractive index of fifth lens 250, and a refractive index of sixth lens 260, in the optical imaging system 200, are lower than or equal to 1.55. In this case, the refractive index of first lens 210 is substantially the same as that of third lens 230. The refractive index of second lens 220 and the refractive index of seventh lens 270, in the optical imaging system 200, are higher than or equal to 1.64. In optical imaging system 200, second lens 220 may have

TABLE 1

First Example
EPD = 2.321 f = 6.0350 TL = 5.180

| Surface No. | | Radius of Curvature | Thickness/ Distance | Focal Length | Refractive Index | Abbe Number |
|---|---|---|---|---|---|---|
| S1 | First Lens | 1.3800 | 0.8000 | 2.440 | 1.537 | 56.0 |
| S2 | | −20.9000 | 0.0800 | | | |
| S3 | Second Lens | 5.6400 | 0.1500 | −6.040 | 1.661 | 20.4 |
| S4 | | 2.3300 | 0.2900 | | | |
| S5 | Third Lens | 2.9400 | 0.2300 | −11.950 | 1.537 | 56.0 |
| S6 | | 1.9600 | 0.1200 | | | |
| S7 | Stop | infinity | 0.1400 | | | |
| S8 | Fourth Lens | −8.0500 | 0.1500 | −12.560 | 1.636 | 23.9 |
| S9 | | −10697.340 | 0.2500 | | | |
| S10 | Fifth Lens | −12.8900 | 0.1800 | −23.650 | 1.636 | 23.9 |
| S11 | | −86.4400 | 0.9200 | | | |
| S12 | Sixth Lens | −3.7000 | 0.1500 | −4.990 | 1.544 | 56.0 |
| S13 | | 10.5300 | 0.1500 | | | |
| S14 | Seventh Lens | 15.6700 | 0.7400 | 7.510 | 1.651 | 21.5 |
| S15 | | −7.0800 | 0.1000 | | | |
| S16 | Filter | infinity | 0.1100 | | 1.519 | 64.2 |
| S17 | | infinity | 0.6200 | | | |

Figure 4:
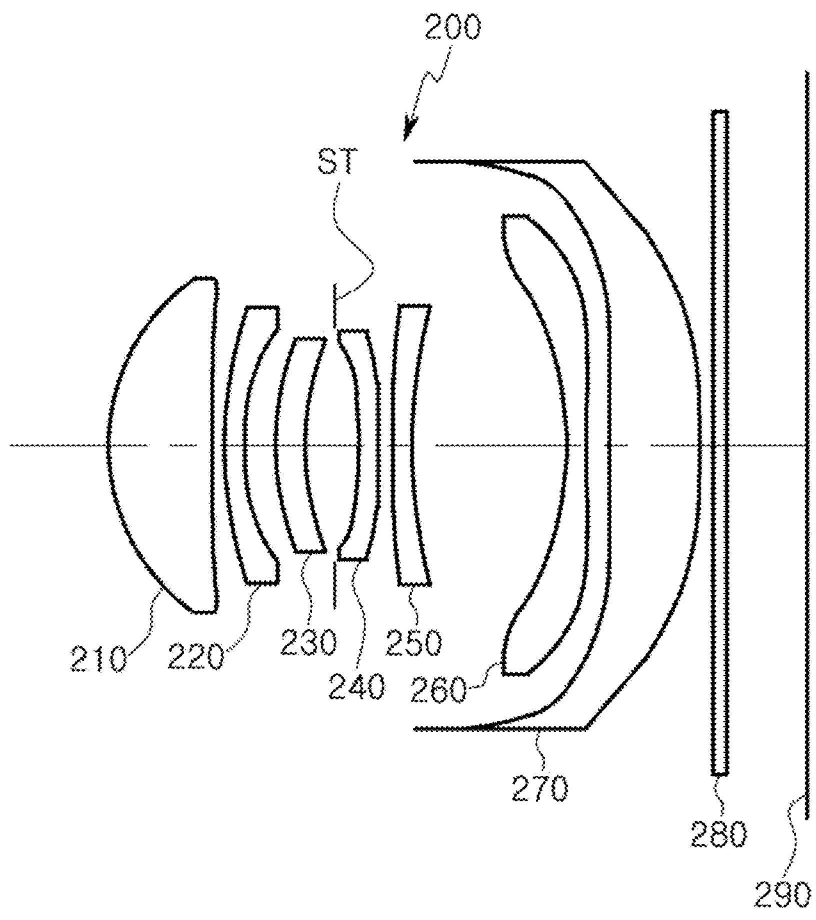
FIG. 4 is a diagram of an optical imaging system according to a second example.

An optical imaging system according to a second example will be described with reference to FIG. 4. An optical imaging system 200 includes a first lens 210, a second lens 220, a third lens 230, a fourth lens 240, a fifth lens 250, a sixth lens 260, and a seventh lens 270.

The first lens 210 has a positive refractive power and opposing convex surfaces. The second lens 220 has a substantially the highest refractive index, while first lens has substantially the lowest refractive index.

An effective diameter of a lens in the optical imaging system 200 may be gradually reduced in a direction toward stop ST. For example, an effective diameter of fourth lens 240 disposed adjacently to stop ST may be smaller than effective diameters of lenses adjacent thereto. In a manner different from the case described above, a lens disposed distantly from stop ST may have a relatively large effective diameter. For example, seventh lens 270 disposed farthest from stop ST has the largest effective diameter.

Figure 5:
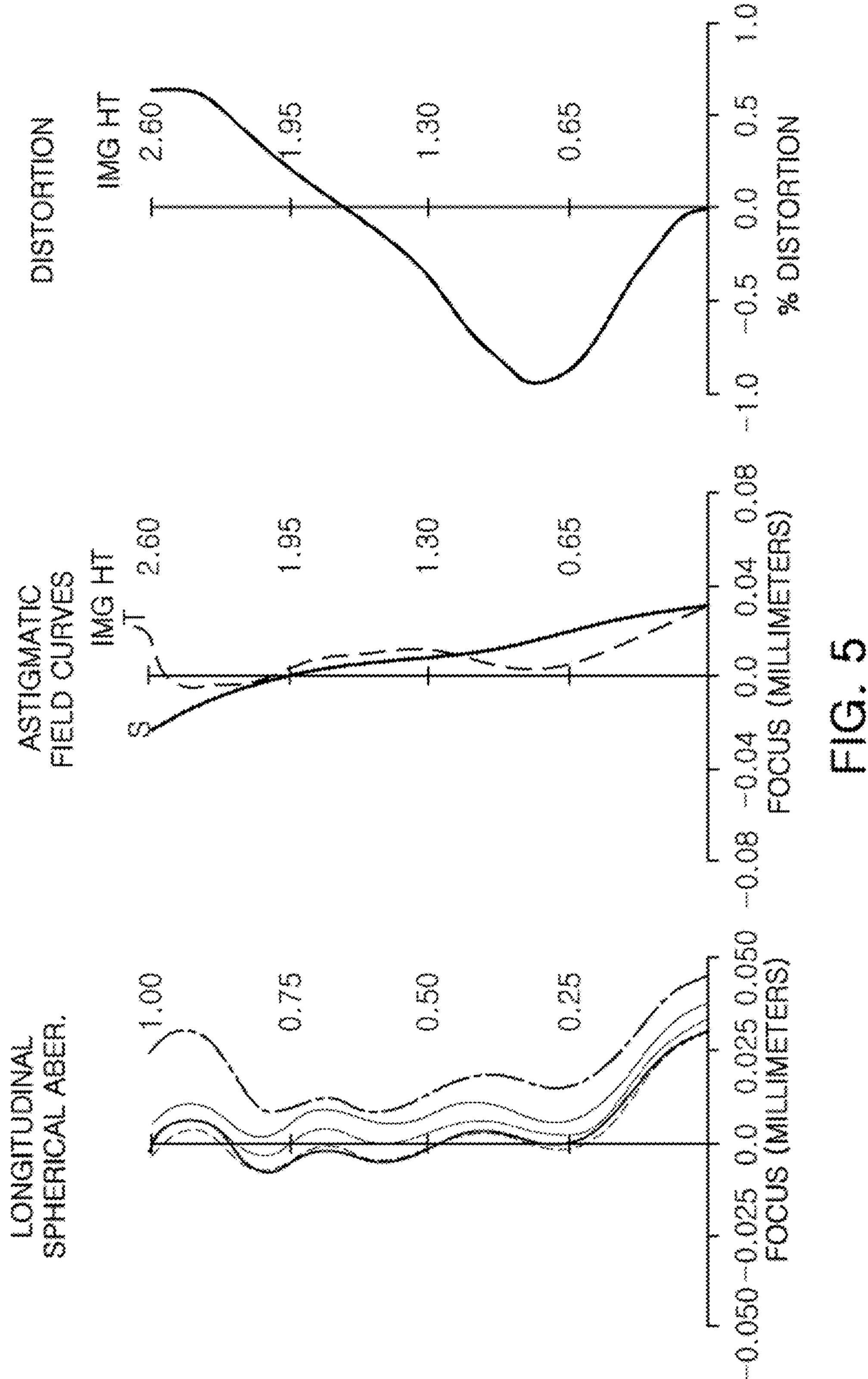
FIG. 5 is a set of graphs illustrating aberration curves of the optical imaging system illustrated in FIG. 4.

An optical imaging system having the configuration described above represents aberration characteristics as illustrated by the graphs in FIG. 5. FIG. 6 lists aspherical characteristics of the optical imaging system according to the example. Table 2 lists lens characteristics of the optical imaging system according to the example.

TABLE 2

| Second Example<br>EPD = 2.321 f = 6.0350 TL = 5.180 | | | | | | |
|---|---|---|---|---|---|---|
| Surface No. | | Radius of Curvature | Thickness/ Distance | Focal Length | Refractive Index | Abbe Number |
| S1 | First Lens | 1.4000 | 0.7690 | 2.500 | 1.537 | 56.0 |
| S2 | | −27.2300 | 0.0800 | | | |
| S3 | Second Lens | 4.8800 | 0.1520 | −5.900 | 1.661 | 20.4 |
| S4 | | 1.9700 | 0.2250 | | | |
| S5 | Third Lens | 3.2000 | 0.2120 | −19.960 | 1.537 | 56.0 |
| S6 | | 2.4100 | 0.1580 | | | |
| S7 | Stop | infinity | 0.2400 | | | |
| S8 | Fourth Lens | −8.9200 | 0.1500 | −29.940 | 1.636 | 23.9 |
| S9 | | −16.760 | 0.1000 | | | |
| S10 | Fifth Lens | 6.4800 | 0.1500 | −30.220 | 1.544 | 56.0 |
| S11 | | 4.6200 | 1.1280 | | | |
| S12 | Sixth Lens | −3.5000 | 0.1500 | −4.490 | 1.544 | 56.0 |
| S13 | | 8.300 | 0.1710 | | | |
| S14 | Seventh Lens | −18.8600 | 0.6650 | 9.030 | 1.651 | 21.5 |
| S15 | | −8.5400 | 0.1000 | | | |
| S16 | Filter | infinity | 0.1100 | | 1.519 | 64.2 |
| S17 | | infinity | 0.6200 | | | |

Figure 7:
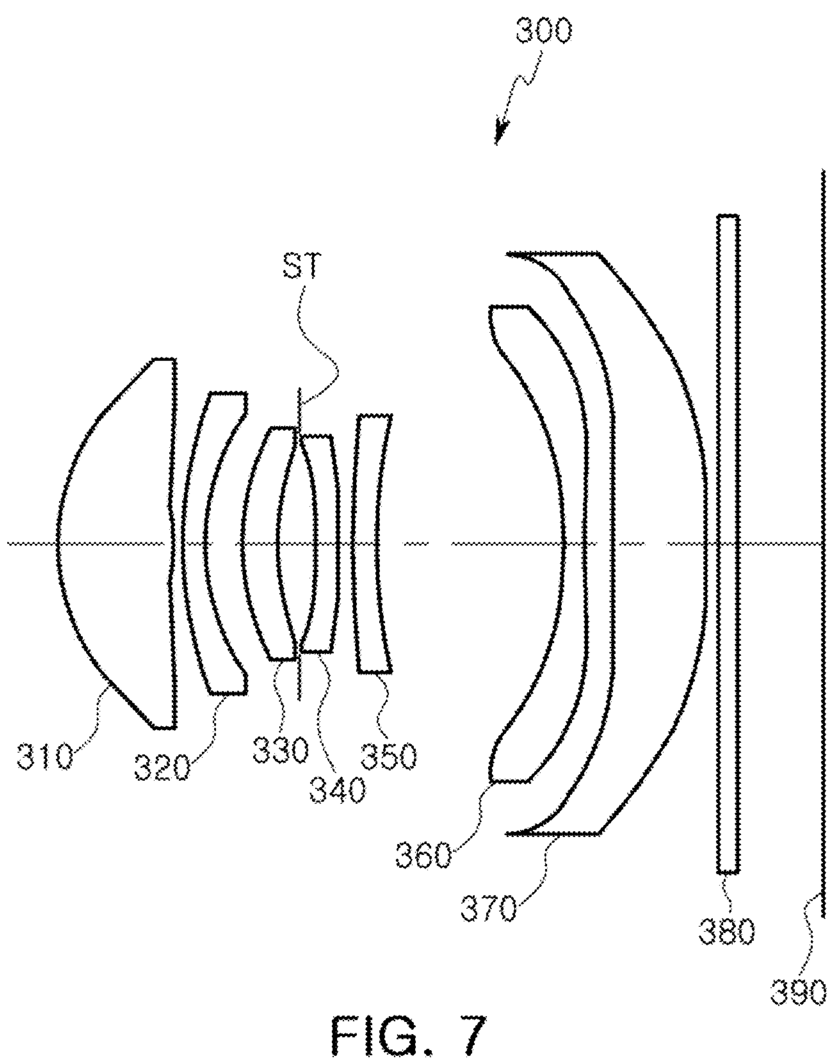
FIG. 7 is a diagram of an optical imaging system according to a third example.

An optical imaging system according to a third example will be described with reference to FIG. 7. An optical imaging system 300 includes a first lens 310, a second lens 320, a third lens 330, a fourth lens 340, a fifth lens 350, a sixth lens 360, and a seventh lens 370.

The first lens 310 has a positive refractive power and opposing convex surfaces. The second lens 320 has a negative refractive power, a convex object-side surface, and a concave image-side surface. The third lens 330 has a negative refractive power, a convex object-side surface, and a concave image-side surface. The fourth lens 340 has a negative refractive power, a concave object-side surface, and a convex image-side surface.

The fifth lens 350 has a negative refractive power, a convex object-side surface, and a concave image-side surface. The sixth lens 360 has a negative refractive power and opposing concave surfaces. In addition, the sixth lens 360 includes inflection points formed on opposing surfaces. The seventh lens 370 has a positive refractive power and opposing convex surfaces. In addition, the seventh lens 370 includes inflection points formed on opposing surfaces.

In the configuration described above, first lens 310 has the highest degree of positive refractive power, while sixth lens 360 has the highest degree of negative refractive power. In the example described above, an object-side surface of first lens 310 is more convex than surfaces of other lenses, while the image-side surface of the second lens 320 is more concave than surfaces of other lenses. In the configuration described above, a paraxial region of first lens 310 is formed to be thicker than paraxial regions of other lenses. In the example described above, a distance between fifth lens 350 and sixth lens 360 is longer than that between other lenses. A distance between the first lens 310 and the second lens 320 and a distance between the sixth lens 360 and the seventh lens 370 may be shorter than that between other lenses.

The optical imaging system 300 further includes a filter 380, an image sensor 390, and a stop ST. Filter 380 is interposed between seventh lens 370 and image sensor 390, while stop ST is interposed between third lens 330 and fourth lens 340.

A refractive index of first lens 310, a refractive index of third lens 330, a refractive index of fifth lens 350, and a refractive index of sixth lens 360, in the optical imaging system 300, may be lower than or equal to 1.55. In this case, the refractive index of first lens 310 is substantially the same as that of third lens 330. The refractive index of second lens 320 and the refractive index of seventh lens 370, in the optical imaging system 300, are higher than or equal to 1.64. In the optical imaging system 300, second lens 320 may have substantially the highest refractive index, while first lens 310 may have substantially the lowest refractive index.

An effective diameter of a lens in optical imaging system 300 may be gradually reduced in a direction toward stop ST. For example, an effective diameter of fourth lens 340 disposed adjacently to stop ST may be smaller than effective diameters of lenses adjacent thereto. In a manner different from the case described above, a lens disposed distantly from stop ST may have a relatively large effective diameter. For example, seventh lens 370 disposed farthest from stop ST alternately has the largest effective diameter.

Figure 8:
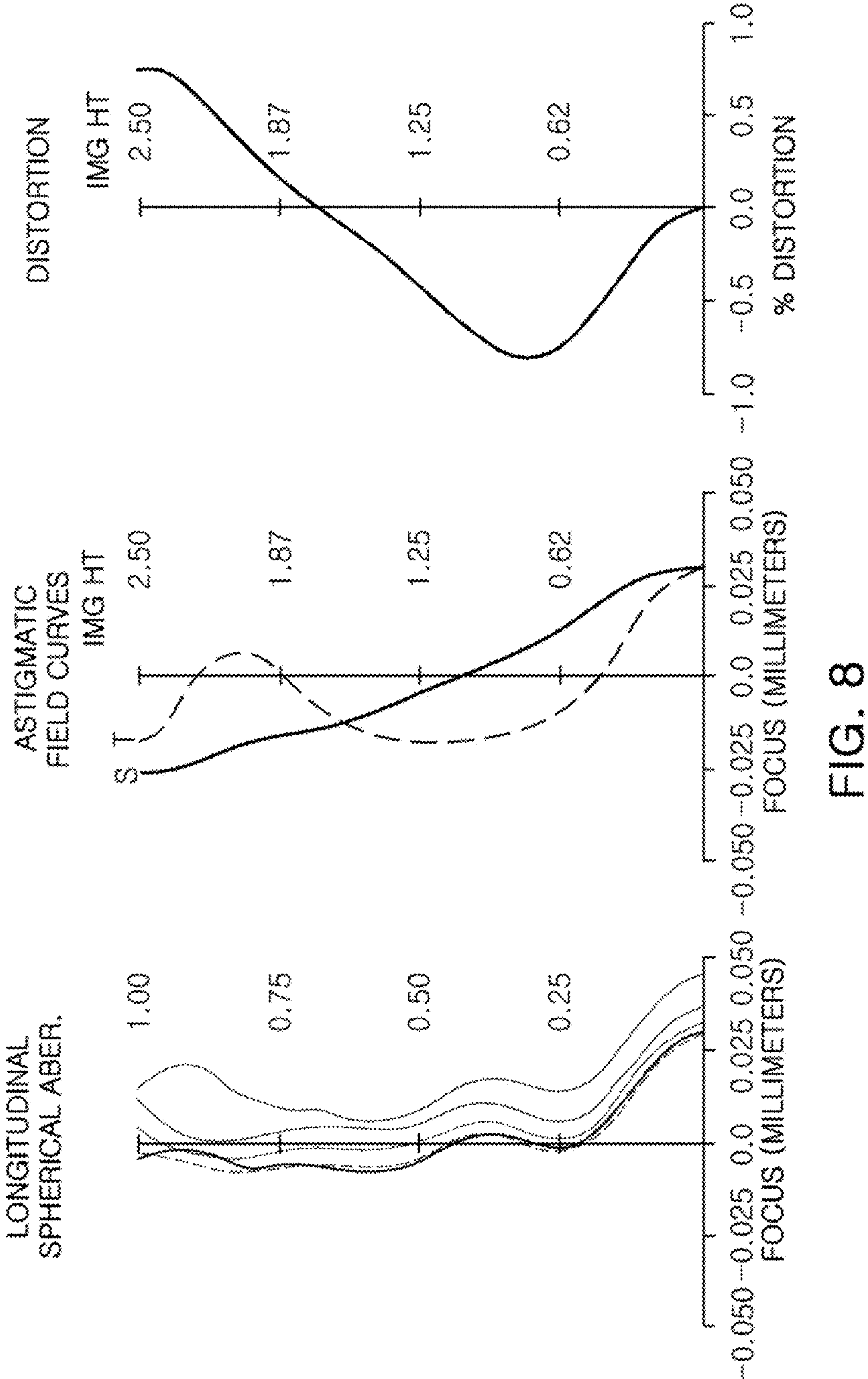
FIG. 8 is a set of graphs illustrating aberration curves of the optical imaging system illustrated in FIG. 7.

An optical imaging system having the configuration described above represents aberration characteristics as illustrated in the graphs in FIG. 8. FIG. 9 lists aspherical characteristics of the optical imaging system according to the example. Table 3 lists lens characteristics of the optical imaging system according to the example.

TABLE 3

| Third Example<br>EPD = 2.321 f = 6.0340 TL = 5.179 | | | | | | |
|---|---|---|---|---|---|---|
| Surface No. | | Radius of Curvature | Thickness/ Distance | Focal Length | Refractive Index | Abbe Number |
| S1 | First Lens | 1.4000 | 0.7610 | 2.510 | 1.537 | 56.0 |
| S2 | | −28.1900 | 0.0800 | | | |
| S3 | Second Lens | 4.8500 | 0.1500 | −5.150 | 1.661 | 20.4 |
| S4 | | 1.9900 | 0.2500 | | | |
| S5 | Third Lens | 3.1400 | 0.2310 | −16.470 | 1.537 | 56.0 |
| S6 | | 2.2600 | 0.1280 | | | |
| S7 | Stop | infinity | 0.1210 | | | |
| S8 | Fourth Lens | −10.3700 | 0.1610 | −26.390 | 1.636 | 23.9 |
| S9 | | −26.980 | 0.1000 | | | |
| S10 | Fifth Lens | 5.3800 | 0.1500 | −60.070 | 1.544 | 56.0 |
| S11 | | 4.5800 | 1.2560 | | | |
| S12 | Sixth Lens | −3.4600 | 0.1500 | −4.670 | 1.651 | 56.0 |
| S13 | | 9.9000 | 0.1770 | | | |
| S14 | Seventh Lens | 15.9300 | 0.6300 | 10.830 | 1.651 | 21.5 |
| S15 | | −12.6700 | 0.1000 | | | |
| S16 | Filter | infinity | 0.1100 | | 1.519 | 64.2 |
| S17 | | infinity | 0.6242 | | | |

Figure 10:
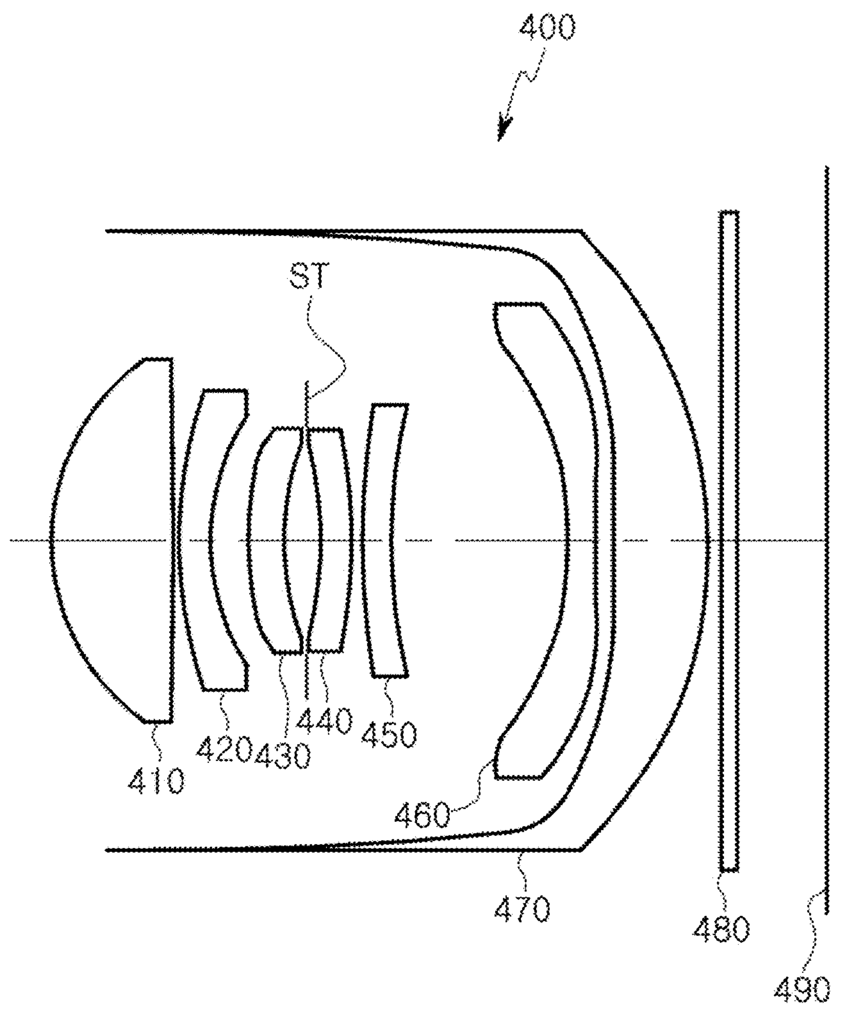
FIG. 10 is a diagram of an optical imaging system according to a fourth example.

An optical imaging system according to a fourth example will be described with reference to FIG. 10. An optical imaging system 400 includes a first lens 410, a second lens 420, a third lens 430, a fourth lens 440, a fifth lens 450, a sixth lens 460, and a seventh lens 470.

The first lens 410 has a positive refractive power and opposing convex surfaces. The second lens 420 has a negative refractive power, a convex object-side surface, and a concave image-side surface. The third lens 430 has a negative refractive power, a convex object-side surface, and a concave image-side surface. The fourth lens 440 has a negative refractive power, a concave object-side surface, and a convex image-side surface.

The fifth lens 450 has a positive refractive power, a convex object-side surface, and a concave image-side surface. The sixth lens 460 has a negative refractive power and opposing concave surfaces. In addition, the sixth lens 460 includes inflection points formed on opposing surfaces. The seventh lens 470 has a negative refractive power and opposing convex surfaces. In addition, the seventh lens 470 includes inflection points formed on opposing surfaces.

In the configuration described above, first lens 410 has the highest degree of positive refractive power, while sixth lens 460 has the highest degree of negative refractive power. In the example described above, an object-side surface of first lens 410 is more convex than surfaces of other lenses, while the image-side surface of second lens 420 is more concave than surfaces of other lenses. In the configuration described above, a paraxial region of first lens 410 is formed to be thicker than paraxial regions of other lenses. A paraxial region of fifth lens 450 is formed to be thinner than paraxial regions of other lenses. In the example described above, a distance between fifth lens 450 and sixth lens 460 is longer than that between other lenses. A distance between first lens 410 and second lens 420 is shorter than that between other lenses.

The optical imaging system 400 further includes a filter 480, an image sensor 490, and a stop ST. Filter 480 is interposed between seventh lens 470 and image sensor 490, while stop ST is interposed between third lens 430 and fourth lens 440.

A refractive index of first lens 410, a refractive index of third lens 430, a refractive index of fifth lens 450, and a refractive index of sixth lens 460, in optical imaging system 400, may be lower than or equal to 1.55. The refractive index of second lens 420 and the refractive index of seventh lens 470, in the optical imaging system 400, are higher than or equal to 1.65. In the optical imaging system 400, second lens 420 may have substantially the highest refractive index, while first lens 410 may have substantially the lowest refractive index. The refractive index of fourth lens 440, in the optical imaging system 400, is higher than or equal to 1.6.

An effective diameter of a lens in the optical imaging system 400 may be gradually reduced in a direction toward stop ST. For example, an effective diameter of third lens 430 disposed adjacently to stop ST is smaller than effective diameters of lenses adjacent thereto. In a manner different from the case described above, a lens disposed distantly from stop ST may have a relatively large effective diameter. For example, seventh lens 470 disposed farthest from stop ST has the largest effective diameter.

Figure 11:
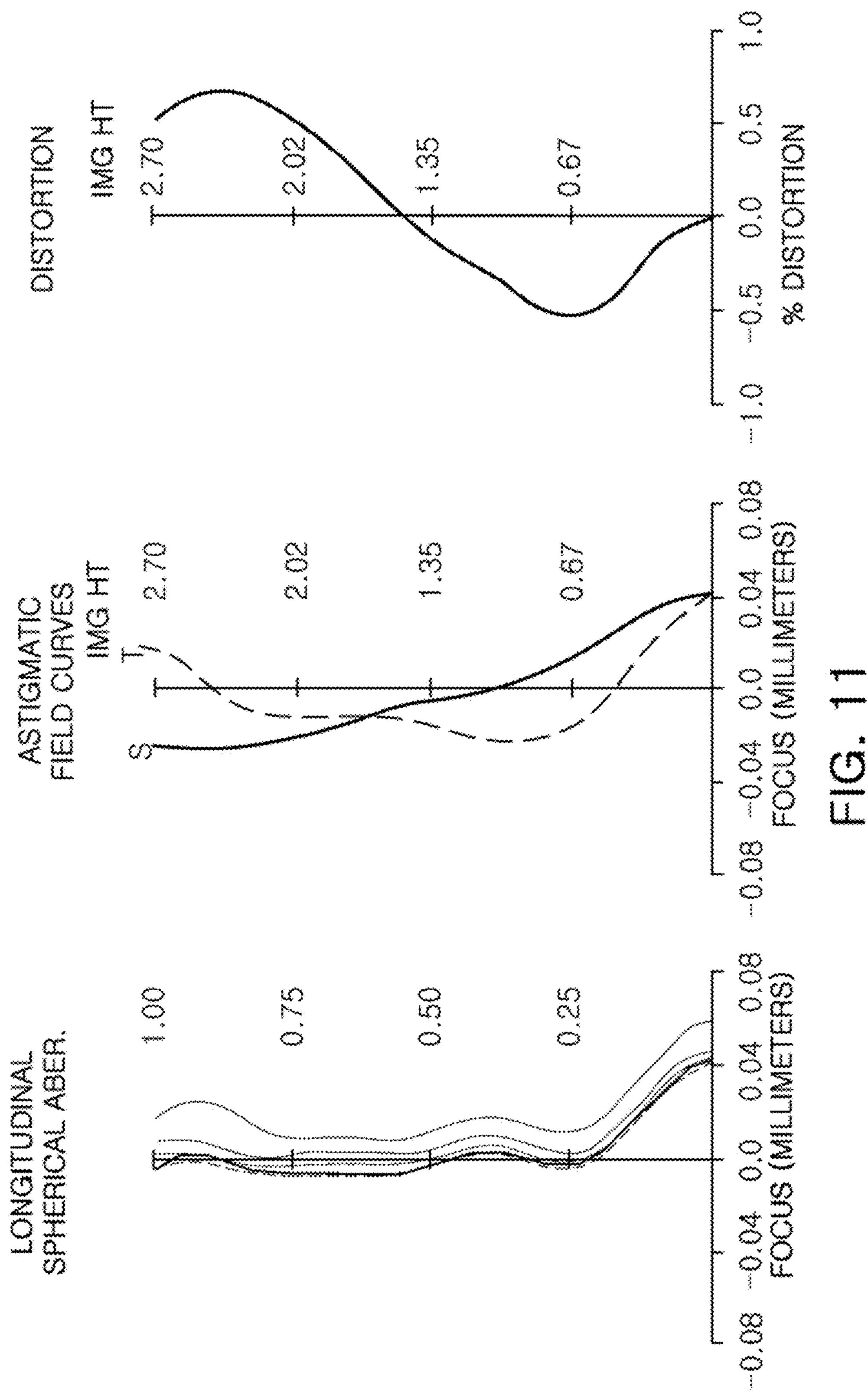
FIG. 11 is a set of graphs illustrating aberration curves of the optical imaging system illustrated in FIG. 10.

An optical imaging system having the configuration described above represents aberration characteristics as illustrated by the graphs in FIG. 11. FIG. 12 lists aspherical characteristics of the optical imaging system according to the example. Table 4 lists lens characteristics of the optical imaging system according to the example.

TABLE 4

| Fourth Example EPD = 2.327 f = 6.0489 TL = 5.232 | | | | | | | |
|---|---|---|---|---|---|---|---|
| Surface No. | | Radius of Curvature | Thickness/ Distance | Focal Length | Refractive Index | Abbe Number |
| S1 | First Lens | 1.4100 | 0.7720 | 2.530 | 1.537 | 56.0 |
| S2 | | −31.6900 | 0.0800 | | | |
| S3 | Second Lens | 4.8700 | 0.2000 | −5.050 | 1.661 | 20.4 |
| S4 | | 1.9600 | 0.2610 | | | |
| S5 | Third Lens | 3.2900 | 0.2320 | 15.620 | 1.544 | 56.0 |
| S6 | | 2.3100 | 0.1180 | | | |
| S7 | Stop | infinity | 0.1350 | | | |
| S8 | Fourth Lens | −8.4300 | 0.2000 | 18.980 | 1.636 | 23.9 |
| S9 | | −27.700 | 0.1000 | | | |
| S10 | Fifth Lens | 5.0500 | 0.1700 | 420.180 | 1.544 | 56.0 |
| S11 | | 5.1100 | 1.1670 | | | |
| S12 | Sixth Lens | −3.4600 | 0.2000 | −4.950 | 1.544 | 56.0 |
| S13 | | 12.7300 | 0.1270 | | | |
| S14 | Seventh Lens | 733.4600 | 0.6290 | '−10.95 | 1.651 | 21.5 |
| S15 | | −7.2700 | 0.1000 | | | |
| S16 | Filter | infinity | 0.1100 | | 1.519 | 64.2 |
| S17 | | infinity | 0.6313 | | | |

Table 5 lists values of Conditional Expressions of the optical imaging system according to first to fourth examples.

TABLE 5

| Conditional Equation | First Example | Second Example | Third Example | Fourth Example |
|---|---|---|---|---|
| TL/f | 0.8583 | 0.8583 | 0.8583 | 0.8650 |
| f/(Img HT) | 2.321 | 2.321 | 2.414 | 2.240 |
| Nd5 | 1.636 | 1.544 | 1.544 | 1.544 |
| Nd7 | 1.651 | 1.651 | 1.651 | 1.651 |
| f5/f | −3.919 | −5.007 | −9.955 | 69.46 |
| f/EPD | 2.60 | 2.60 | 2.60 | 2.60 |

Figures 13, 14:
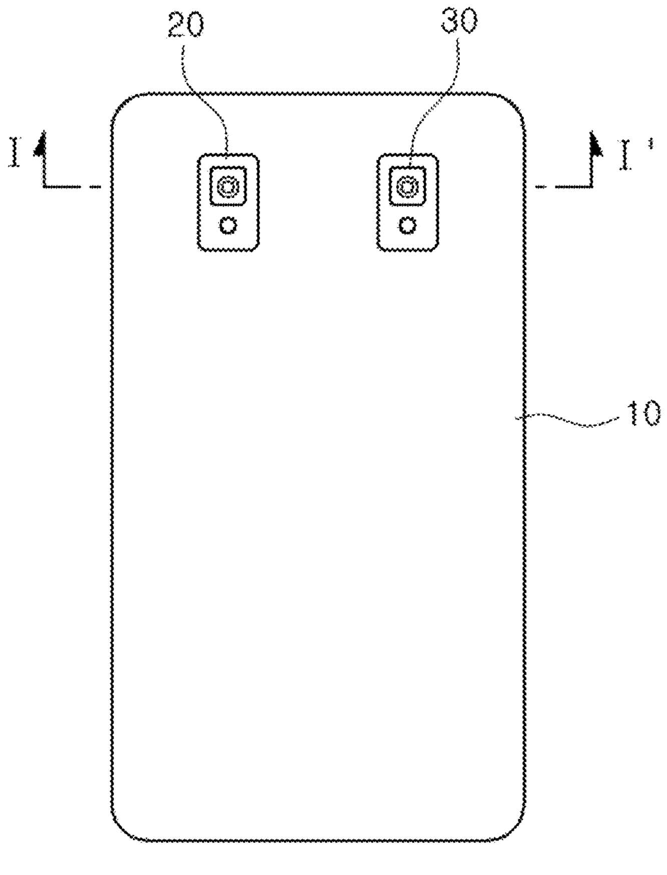
FIG. 13 is a rear view of a portable terminal including an optical imaging system mounted therein, according to an example.
FIG. 14 is a cross-sectional view of the portable terminal illustrated in FIG. 13.

Hereinafter, a portable terminal including an optical imaging system mounted therein, according to an example, will be described with reference to FIGS. 13 and 14. A portable terminal 10 includes a plurality of camera modules 20 and 30. A first camera module 20 includes a first optical imaging system 101 configured to capture an image of a subject at a short distance. A second camera module 30 includes second optical imaging systems 100, 200, 300, and 400 formed to capture an image of a distant subject.

The first optical imaging system 101 includes a plurality of lenses. For example, the first optical imaging system 101 may include four or more lenses. The first optical imaging system 101 is configured to capture images of objects at short distance. In detail, first optical imaging system 101 may have a relatively wide angle of view of 50° or above, while a ratio (TL/f) may be higher than or equal to 1.0.

The second optical imaging systems 100, 200, 300, and 400 include a plurality of lenses. For example, second optical imaging systems 100, 200, 300, and 400 may include seven lenses. The second optical imaging systems 100, 200, 300, and 400 may be provided as one optical imaging system among optical imaging systems according to the first to fourth examples described above. The second optical imaging systems 100, 200, 300, and 400 may be configured to capture an image of a distant object. In detail, second optical imaging systems 100, 200, 300, and 400 may have a half angle of view of 20° or above, while a ratio (TL/f) may be below 1.0.

First optical imaging system 101 and second optical imaging systems 100, 200, 300, and 400 may have substantially the same size. In detail, an overall length L1 of first optical imaging system 101 is substantially the same as an overall length L2 of second optical imaging systems 100, 200, 300, and 400. Alternatively, a ratio (L1/L2) of the overall length L1 of first optical imaging system 101 to overall length L2 of the second optical imaging systems 100, 200, 300, and 400 may be 0.8 to 1.0. Alternatively, a ratio (L2/h) of the overall length L2 of the second optical imaging systems 100, 200, 300, and 400 to a thickness h of the portable terminal 10 may be lower than or equal to 0.8.

As set forth above, according to examples, an optical imaging system capable of capturing images of distant objects and being mounted in a small terminal may be provided. While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens having a refractive power;

a second lens having a convex object-side surface along an optical axis of the optical imaging system;

a third lens having a convex object-side surface along the optical axis;

a fourth lens having a negative refractive power;

a fifth lens having a refractive power;

a sixth lens having a negative refractive power; and a seventh lens having a refractive power, wherein the first to seventh lenses are sequentially disposed in ascending numerical order along the optical axis from an object side of the optical imaging system toward an imaging plane of the optical imaging system, the optical imaging system has a total number of seven lenses having a refractive power, and a thickness along the optical axis of the third lens is greater than a thickness along the optical axis of the fourth lens.

2. The optical imaging system of claim 1, wherein the first lens has a convex object-side surface along the optical axis.

3. The optical imaging system of claim 1, wherein the second lens has a concave image-side surface along the optical axis.

4. The optical imaging system of claim 1, wherein the fourth lens has a concave object-side surface along the optical axis.

5. The optical imaging system of claim 1, wherein the fifth lens has a convex object-side surface along the optical axis.

6. The optical imaging system of claim 1, wherein the fifth lens has a concave image-side surface along the optical axis.

7. The optical imaging system of claim 1, wherein the sixth lens has a concave image-side surface along the optical axis.

8. The optical imaging system of claim 1, wherein the seventh lens has a convex object-side surface along the optical axis.

9. An optical imaging system comprising:

a first lens having a refractive power;

a second lens having a convex object-side surface along an optical axis of the optical imaging system;

a third lens having a negative refractive power and a convex object-side surface along the optical axis;

a fourth lens having a negative refractive power;

a fifth lens having a negative refractive power and a convex object-side surface along the optical axis;

a sixth lens having a refractive power; and a seventh lens having a refractive power, wherein the first to seventh lenses are sequentially disposed in ascending numerical order along the optical axis from an object side of the optical imaging system toward an imaging plane of the optical imaging system, the optical imaging system has a total number of seven lenses having refractive power, and a thickness along the optical axis of the fourth lens is greater than a thickness along the optical axis of the fifth lens.

10. The optical imaging system of claim 9, wherein the first lens has a convex object-side surface along the optical axis.

11. The optical imaging system of claim 9, wherein the second lens has a concave image-side surface along the optical axis.

12. The optical imaging system of claim 9, wherein the third lens has a concave image-side surface along the optical axis.

13. The optical imaging system of claim 9, wherein the fourth lens has a convex image-side surface along the optical axis.

14. The optical imaging system of claim 9, wherein the fifth lens has a concave image-side surface along the optical axis.

15. The optical imaging system of claim 9, wherein the sixth lens has a concave image-side surface along the optical axis.

* * * * *